United States Patent [19]
Storn et al.

[11] Patent Number: 5,722,088
[45] Date of Patent: Feb. 24, 1998

[54] AUTOMATIC PREFIX SYSTEMS AND METHODS FOR MOBILE RADIOTELEPHONES

[75] Inventors: R. Kevin Storn, Raleigh; Anders Torstensson, Cary, both of N.C.

[73] Assignee: Ericsson Inc., Research Triangle Park, N.C.

[21] Appl. No.: 530,943

[22] Filed: Sep. 20, 1995

[51] Int. Cl.[6] .................... H04M 11/00; H04Q 7/00
[52] U.S. Cl. .............. 455/564; 455/565; 455/401; 455/460
[58] Field of Search ................ 379/58, 59, 57, 379/63, 355, 356, 357, 359; 455/554, 564, 565, 401, 460, 419

[56] References Cited

U.S. PATENT DOCUMENTS

| | | | |
|---|---|---|---|
| 5,157,719 | 10/1992 | Waldman | 379/356 |
| 5,161,184 | 11/1992 | Smith et al. | 379/413 |
| 5,216,709 | 6/1993 | Wen et al. | 379/354 |
| 5,274,693 | 12/1993 | Waldman | 379/59 |
| 5,305,372 | 4/1994 | Tomiyori | 379/59 |
| 5,333,188 | 7/1994 | Bogart et al. | 379/269 X |
| 5,402,481 | 3/1995 | Waldman | 379/355 |
| 5,455,858 | 10/1995 | Lin | 379/356 X |
| 5,475,743 | 12/1995 | Nixon et al. | 379/355 X |
| 5,509,067 | 4/1996 | Murata | 379/355 |
| 5,535,260 | 7/1996 | Zicker et al. | 455/564 |
| 5,561,705 | 10/1996 | Allard et al. | 455/564 |
| 5,581,595 | 12/1996 | Iwashita et al. | 379/57 |

FOREIGN PATENT DOCUMENTS

| | | |
|---|---|---|
| 0 526 832 A2 | 2/1993 | European Pat. Off. . |
| 0 530 010 A2 | 3/1994 | European Pat. Off. . |
| 0 631 418 A1 | 12/1994 | European Pat. Off. . |
| WO 94/22260 | 9/1994 | WIPO . |
| WO 95/06381 | 3/1995 | WIPO . |

*Primary Examiner*—David D. Knepper
*Assistant Examiner*—Scott Richardson
*Attorney, Agent, or Firm*—Myers Bigel Sibley & Sajovec

[57] ABSTRACT

A mobile radiotelephone is responsive to user entry of an extension such as the last four digits of a telephone number, to identify a prefix such as the first three digits of a telephone number, for the user-entered extension. By automatically identifying a prefix, the user need not enter all of the numbers for the destination telephone. A default automatic prefix may be stored and retrieved in response to user entry of an extension. Alternatively, in response to user entry of an extension, the stored extensions in a memory such as a speed dialing memory are searched to identify a match to the user-entered extension. The associated prefix for the matched extension is retrieved. Default and speed dialing prefix identification may be combined. Simplified dialing and enhanced user safety are thereby provided.

16 Claims, 4 Drawing Sheets

AUTOMATIC PREFIX SYSTEMS AND METHODS FOR MOBILE RADIOTELEPHONES

FIELD OF THE INVENTION

This invention relates to communications systems and methods and more particularly to mobile radiotelephone communications systems and methods which communicate with other telephones using telephone numbers.

BACKGROUND OF THE INVENTION

Mobile radiotelephones are increasingly being used for wireless mobile communications. Mobile radiotelephones typically communicate with destination telephones via terrestrial base stations or orbiting satellites. An example of a mobile radiotelephone communications system is a cellular telephone system. Cellular telephone systems are wide area communications networks which utilize a frequency reuse pattern. Analog cellular telephone systems, digital cellular telephone systems and dual mode analog and digital systems are well-known and widely used throughout the world.

As is commonly understood, a mobile radiotelephone communicates with a destination telephone (another mobile radiotelephone or a wire telephone) using a telephone number. The telephone number includes an optional area code followed by a multiple digit prefix and ends with a multiple digit extension. For example, in the United States, the telephone number (919) 420-2200 includes the optional area code 919, the multiple digit prefix 420, and the multiple digit extension 2200. A similar telephone number format is used for international telephone numbers wherein the area code may include a combination of a country code and city code or only a country code, the prefix includes four digits and the extension includes four digits. Thus, for example, the German telephone number 49-89-2399-4465 includes an area code (country code and city code) of 4989, a prefix of 2399 and an extension of 4465.

Safety concerns dictate that mobile radiotelephones include simplified dialing where possible. Simplified dialing is desired so that the driver of a vehicle is not unduly distracted when placing a call via a mobile radiotelephone.

Many techniques have been applied to simplify dialing for mobile radiotelephone users. For example, mobile radiotelephones often include a speed dialing memory which includes a listing by name, number or other identifying indicia, and a corresponding telephone number. Entry of an identifying indicia causes the mobile radiotelephone to dial the complete telephone number without the need for user entry of the entire telephone number. Unfortunately, speed dialing memories generally require the user to memorize the identifying indicia (such as the speed dial number) for each telephone number. When many telephone numbers are stored in the speed dialing memory, the need to memorize a long list of identifying indicia becomes unduly cumbersome. A mobile radiotelephone speed dialing technique is illustrated in U.S. Pat. No. 5,305,372 to Tomiyori entitled *"Mobile Unit With Speed Dialing Feature for Cellular Telephone Network"*.

Another simplified dialing technique is described in U.S. Pat. No. 5,274,693 to Waldman entitled *"Abbreviated and Enhanced Dialing Apparatus and Methods Particularly Adapted for Cellular or Other Types of Telephone Systems"*. The abbreviated dialing apparatus enables a user to dial telephone numbers having repetitive digits without directly dialing all of the repetitive digits. The user, by executing a prescribed actuation of a prescribed key, such as the "send" key, can cause the system to complete an incomplete telephone number having repetitive finishing zeros or other repetitive finishing digits, instead of directly dialing all of the repetitive digits.

Other simplified dialing techniques relate to automatic area code dialing systems. In particular, it is well-known that when using cellular telephones, an area code must be dialed for all telephone numbers when roaming outside the user's home region. Accordingly, automatic area code systems are used to add a three or four digit area code when the mobile radiotelephone is roaming outside the home region. Thus, the need to enter an area code when roaming is obviated. The area code is typically the user's home region area code, which need not be entered when the user is in the home region, but which needs to be entered when roaming.

Another system for automatic area code dialing is described in U.S. Pat. No. 5,157,719 to Waldman entitled *"Automatic Area Code Dialing Apparatus and Methods Particularly Adapted for Cellular or Other Types of Telephone Systems"*. An apparatus for eliminating the need to repeat dial the area code on a given long distance call is described. The apparatus detects when a subscriber wishes to implement a long distance call. Upon detection of a start of a call, the apparatus automatically displays the last area code dialed.

Notwithstanding the above-described techniques, there remains a need for simplified dialing systems and methods for mobile radiotelephones.

SUMMARY OF THE INVENTION

It is therefore an object of the invention to provide improved mobile radiotelephone systems and methods.

It is another object of the invention to provide mobile radiotelephone systems and methods which reduce the need to dial an entire telephone number to initiate a call to a destination telephone.

These and other objects are provided according to the present invention by mobile radiotelephone systems and methods which include automatic prefix identification which is responsive to user entry of an extension, for identifying a prefix for the user-entered extension. In response to the automatic prefix identification, radiotelephone communication is initiated to a destination telephone using the identified prefix followed by the user-entered extension. By automatically identifying a prefix, the user need not enter all of the numbers for the destination telephone. Simplified dialing and enhanced user safety are thereby provided.

In a first embodiment of automatic prefix identification according to the present invention, a default automatic prefix is stored. In response to user entry of an extension, such as four or five digits followed by the "send" key, the stored default automatic prefix is retrieved and a radiotelephone communication is initiated to the destination telephone using the retrieved default automatic prefix followed by the user-entered extension.

This embodiment stems from the realization that a large organization, such as a corporation or business, often includes many different extensions having the same prefix. For example, an organization may include a common prefix 420 and a series of extensions from 2200 to 2299. When the mobile radiotelephone user is a member of this organization, the user will often dial the common prefix and a desired extension. According to the invention, the user only need dial the extension followed by the "send" key, and the common prefix is retrieved to form a complete telephone number. As part of the first embodiment, means may be provided for accepting user entry of a default automatic prefix and for enabling and disabling the automatic prefix identifying function.

According to a second embodiment of the present invention, a memory, such as a speed dialing memory, stores therein a plurality of telephone numbers, each including an extension and an associated prefix. In response to user entry of an extension, the stored extensions in the speed dialing memory are searched to identify a match to the user-entered extension. The associated prefix for the matched extension is retrieved and a radiotelephone communication is initiated to a telephone using the retrieved prefix followed by the user-entered extension. If an area code is stored with the prefix and extension, the area code and prefix may be retrieved and used to initiate the telephone call. Thus, a speed dialing memory may be used for searching for an automatic prefix, in addition to or instead of its common use for initiating speed dialing calls in response to user input of an identification indicia. It will be understood that the memory may be any memory containing commonly used telephone numbers whether or not used for speed dialing.

According to a third embodiment of the present invention, the first and second embodiments are combined. Thus, in response to user entry of an extension followed by the "send" key, the speed dialing memory is first searched to identify a match to the user-entered extension. If a match is identified, the associated prefix is retrieved and used to initiate a telephone call. If a match is not identified, the default automatic prefix is used for initiating the radiotelephone call.

The present invention may be used in conjunction with automatic area code identifying means. Thus, once the prefix and extension have been identified, a known automatic area code identification system may be used to add the home area code when the mobile radiotelephone is roaming.

By providing automatic prefix systems and methods for mobile radiotelephones, the number of keystrokes or other user inputs for dialing a telephone number may be reduced. Simplified operation and enhanced safety for mobile radiotelephone users are thereby provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
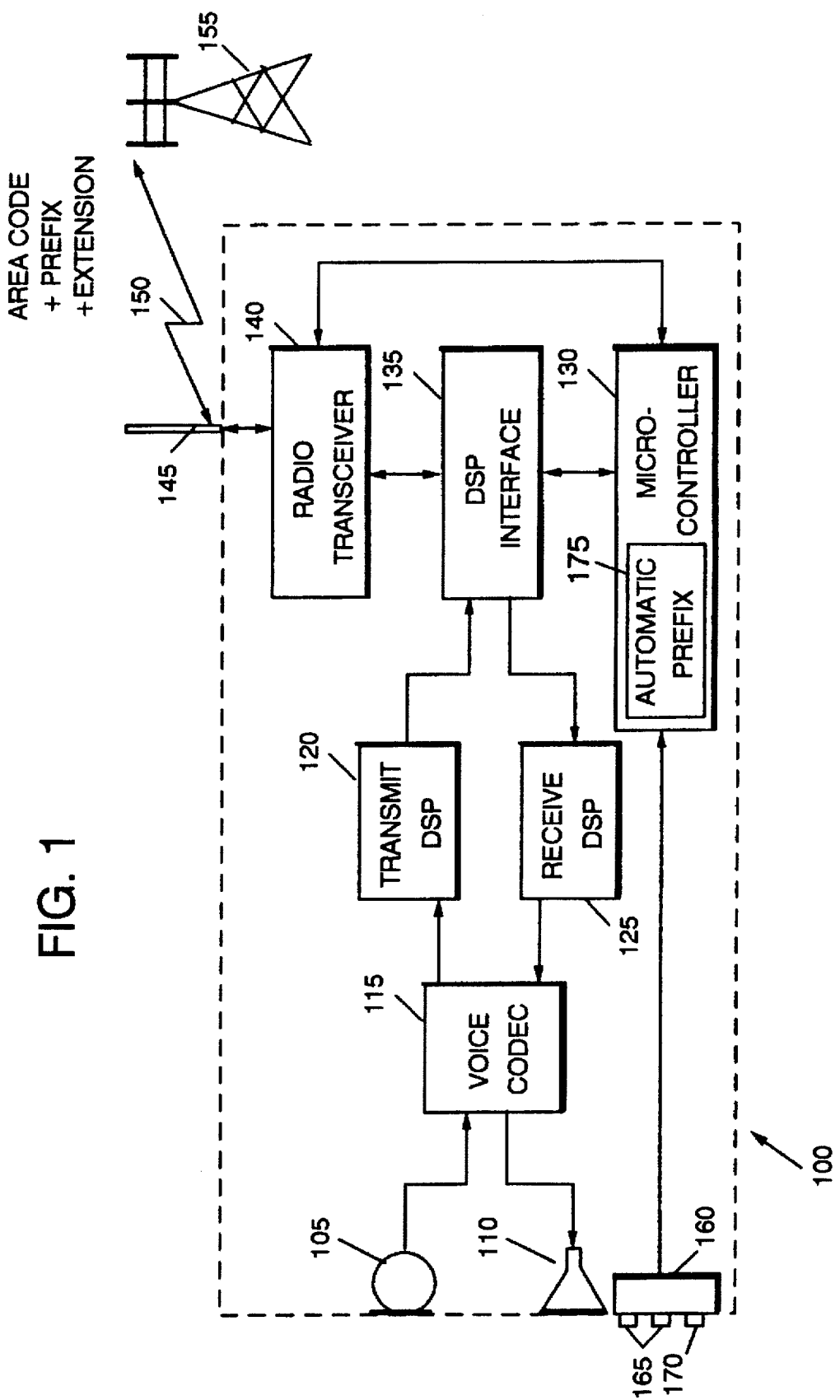
FIG. 1 is a simplified functional block diagram of the mobile radiotelephone according to the present invention.

Referring now to FIG. 1, a simplified functional block diagram of a mobile radiotelephone according to the present invention is shown. Mobile radiotelephone 100 typically transmits and receives radiotelephone communications 150 to and from a terrestrial base station 155 or an orbiting satellite (not shown). As understood by those having skill in the art, mobile radiotelephone 100 communicates with destination telephones via base station 155 using a telephone number including an optional area code followed by a multiple digit prefix and ending with a multiple digit extension. It will be understood that the area code may correspond to a country code and an optional city code for international dialing. For ease of explanation, further description will use the United States telephone system, wherein the area code is a three digit area code, the prefix is a three digit prefix, and the extension is a four digit extension.

Continuing with the description of FIG. 1, antenna 145, radio transceiver 140 and receive Digital Signal Processor (DSP) 125 receive radiotelephone communications 150. Receive DSP 125 processes the signal which is received from the radio transceiver 140 via DSP interface 135 and produces a digital audio signal which can be applied to voice codec 115 for transmission over loudspeaker 110. Transmit DSP 120 receives a digitized voice signal from microphone 105 via voice codec 115 and provides this signal to DSP interface 135 for transmission by radio transceiver 140 and antenna 145. User input means such as keypad 160 includes a plurality of alphanumeric keys 165 and a "send" or other key 170 for initiating radiotelephone communication to a destination telephone. It will be understood that touch screens, voice recognition or other user input means may be used. Microcontroller 130 controls some or all of the components of the mobile radiotelephone 100. The design of a mobile radiotelephone 100 as described in this paragraph is well known to those having skill in the art and need not be described further herein.

Automatic prefix systems and methods 175 according to the present invention are preferably embodied, at least in part, as a stored program which executes on the microcontroller 130. However, the present invention may also be embodied, at least in part, as a stored program executing on another processor. Alternatively, custom logic circuits, or combinations of software and hardware may be used. Analog components may also be used.

Figure 2:
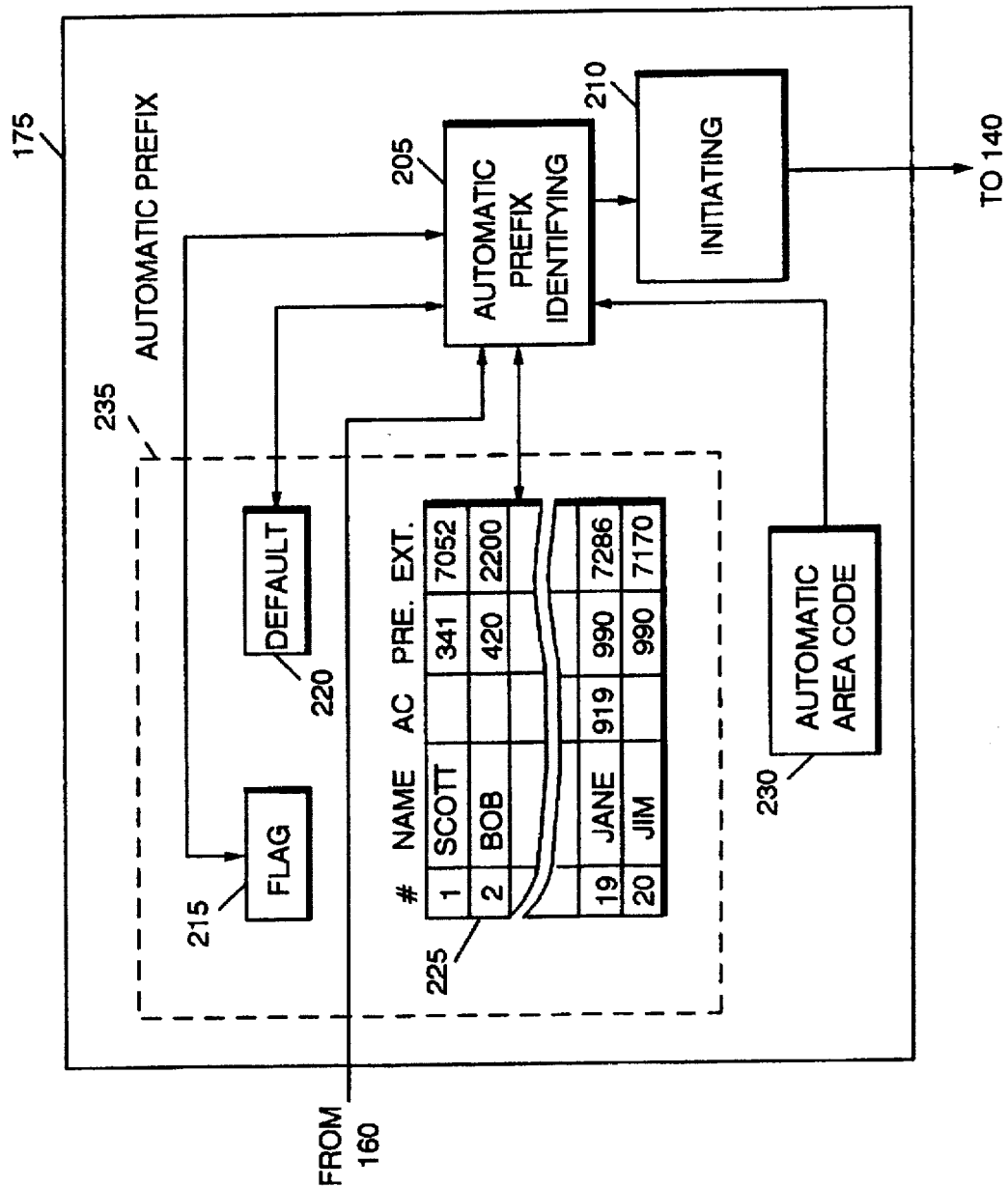
FIG. 2 is a block diagram of automatic prefix systems and methods according to the present invention.

Referring now to FIG. 2, automatic prefix systems and methods 175 according to the invention will be described. As shown in FIG. 2, automatic prefix systems and methods 175 include systems and methods for automatic prefix identifying 205, which are responsive to user entry of an extension via user input device 160, for identifying a prefix for the user-entered extension.

In a first embodiment, automatic prefix identifying systems and methods 205 are responsive to a stored default automatic prefix 220. In a second embodiment, automatic prefix identifying systems and methods 205 are responsive to a memory such as speed dialing memory 225. In a third embodiment, automatic prefix identifying is responsive to both the stored default automatic prefix 220 and to the speed dialing memory 225. In any or all embodiments, automatic prefix identification is also responsive to setting of an automatic prefix identifying flag 215, to indicate that automatic prefix identifying is enabled. All of these embodiments may also be responsive to conventional automatic area code systems and methods 230.

It will be understood that automatic prefix flag 215, default automatic prefix 220 and speed dialing memory 225 are typically implemented in one or more storage devices 235, such as one or more electrically erasable programmable read only memory (EEPROM) chips, and may be on the same chip as microcontroller 130 or on one or more separate chips. In storage device 235, the flag 215 may occupy one byte, the default automatic prefix 220 may occupy two bytes of binary coded decimal data and the speed dialing memory may occupy up to 4K bytes, with each line (#, AC, PRE. and EXT.) being up to 40 bytes long.

Automatic prefix identifying systems and methods 205 are responsive to user entry of an extension from user input means 160 such as a keyboard, to identify a prefix for the user-entered extension. Initiating systems and methods 210 are responsive to the automatic prefix identifying systems and methods 205 to initiate a radiotelephone communication to a destination telephone via radio transceiver 140, using the identified prefix followed by the user-entered extension.

Continuing with the description of FIG. 2, in a first embodiment of the present invention, a default automatic prefix 220 is stored. In response to user entry of an extension, automatic prefix identifying systems and methods 205 retrieve the stored default automatic prefix. In an example of the first embodiment, assume that a mobile radiotelephone user is a member of an organization having hundreds or thousands of extensions with the same prefix 990. The user sets the default automatic prefix 220 to be 990. Then, in response to entry of a four digit extension such as 7070 via numeric keys 165 followed by activation of the "send" key 170, automatic prefix identifying systems and methods 205 retrieve the stored default automatic prefix (990) and initiating systems and methods 210 initiate a radiotelephone communication to a destination telephone using the identified prefix followed by the user-entered extension. Thus, a mobile radiotelephone call to telephone number 990-7070 is initiated.

Automatic prefix enabling means such as flag 215 may also be included so that the user can enable or disable the automatic prefix feature. In this case, automatic prefix identifying is only initiated when the flag 215 is enabled.

A second embodiment of automatic prefix systems and methods 175 includes a memory such as a speed dialing memory 225 which stores therein a plurality of telephone numbers for speed dialing or other purposes. FIG. 2 illustrates a speed dialing memory 225 which stores twenty telephone numbers. Each telephone number includes an identifying indicia. As shown, multiple indicia including a speed dial number (#) from 1-20 and a name (NAME) are included. Some numbers may include an area code (AC). A three digit prefix (PRE.) and a four digit extension (EXT.) are also included. Automatic prefix identifying systems and methods 205 search the stored extensions in the speed dialing memory 225 in response to user entry of an extension, for example using the alphanumeric keys 165 followed by "send" key 170, to identify a match to the user-entered extension. The associated prefix for the matched extension is retrieved. Initiating systems and methods 210 then initiate a radiotelephone communication to a destination telephone using the associated prefix for the matched extension. Thus, the second embodiment uses the speed dialing memory 225 but does not require the user to remember the identifying indicia (number, name or other identifying indicia) for a desired number. The user need only dial the extension followed by the "send" key, and the associated prefix will be identified and transmitted. It will be understood by those having skill in the art that if speed dialing memory 225 also includes an area code, such as the entry for number 19 "Jane" in FIG. 2, the area code may also be retrieved along with the prefix. Thus, if 7286 is entered, 919 990 will be retrieved.

In a third embodiment of the present invention, the default automatic prefix 220 and the speed dialing memory 225 are used in combination. In response to user entry of an extension, the speed dialing memory is first searched. If a match is found, the associated prefix (and optional area code) is retrieved. If a match is not found, then the default automatic prefix is retrieved.

The first, second or third embodiments can all operate in conjunction with automatic area code systems and methods 230. These conventional systems and methods are responsive to the mobile radiotelephone being located outside a home region, i.e. in roaming mode, so that local calls require the use of an area code. After generating a prefix using default automatic prefix 220 or speed dialing memory 225, the area code corresponding to the home region is identified. A radiotelephone communication is then initiated using the identified area code followed by the identified prefix followed by the user-entered extension. Other conventional automatic area code identifying systems and methods may be used which operate independent of or in conjunction with speed dialing memory 225. It will be understood by those having skill in the art that automatic prefix systems and methods according to the invention operate whether the mobile radiotelephone is within its home region or is outside its home region (i.e. roaming). In contrast, conventional automatic area code systems and methods generally operate only in roaming mode, such that the home area code is supplied when roaming.

Figure 3:
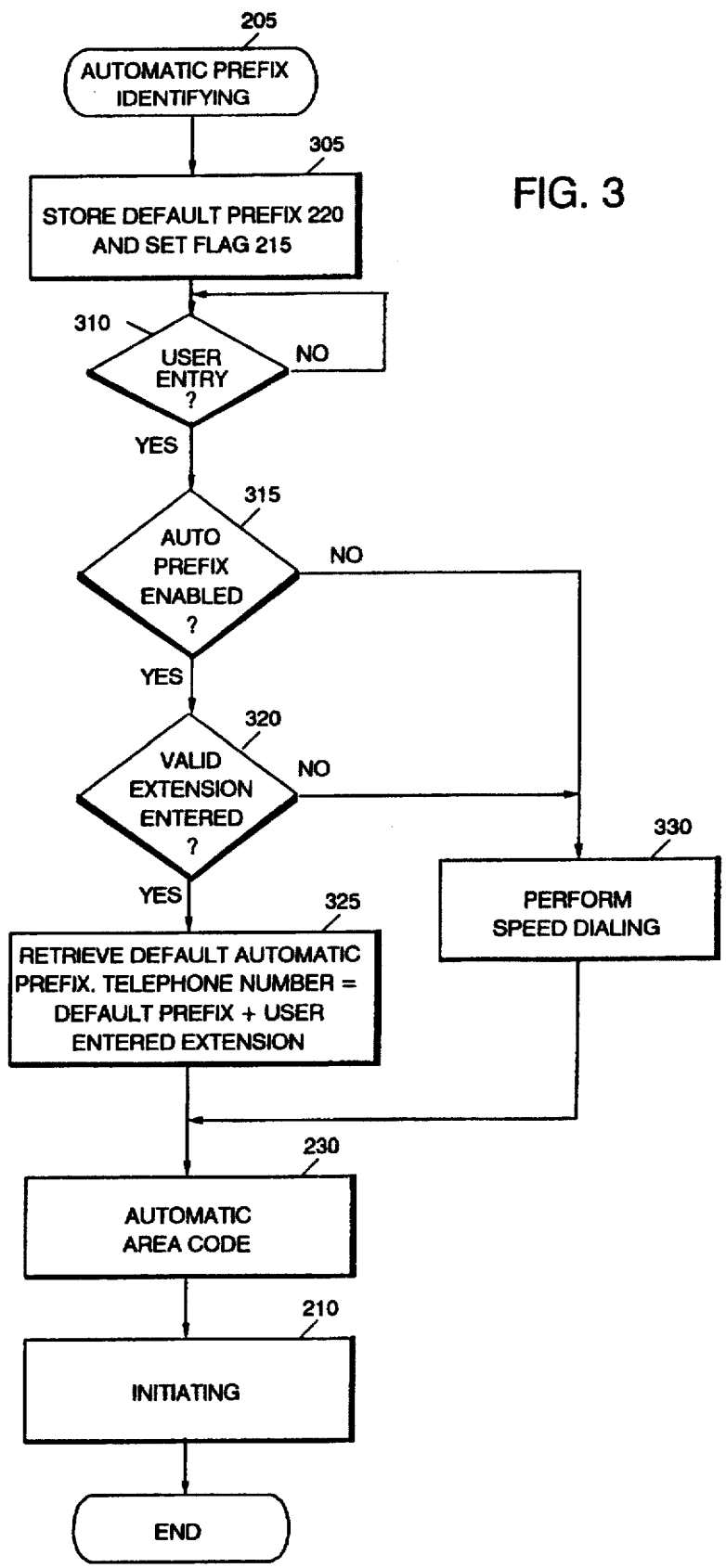
FIG. 3 is a flowchart illustrating detailed operations for a first embodiment of automatic prefix identifying according to the present invention.

Referring now to FIG. 3, detailed operations for the first embodiment of automatic prefix identifying (Block 205 of FIG. 2) will now be described. As shown at Block 305, a default prefix 220 is stored and flag 215 is set. It will be understood that the storing operation of Block 305 may be performed by providing the user with a menu which allows selection of an automatic prefix option and entry of an automatic prefix. Similarly, setting of flag 215 may be provided using a menu which is consistent with those used in the mobile radiotelephone for enabling other functions. Alternatively, voice inputs or other forms of user inputs may be used. In one embodiment, the user can call up an auto-prefix menu and use up and down scroll keys to set the flag 215. The value of the prefix string may be entered by entering the digits and storing these digits using the "send" or "yes" key. The details of storing the default prefix 220 and setting the flag 215 will vary based on the user interface of the particular mobile radiotelephone, and need not be described further herein.

Continuing with the description of FIG. 3, in response to user entry at Block 310 (for example entry of a sequence of digits followed by the "send" key), at Block 315 a test is made as to whether automatic prefix identifying is enabled. If "yes", then at Block 320 a test is made as to whether a valid extension has been entered, for example whether four or five digits have been entered followed by entry of the "send" key 170. If "yes", then at Block 325, the default automatic prefix is retrieved so that the telephone number is the default prefix followed by the user-entered extension.

If auto-prefix was not enabled at Block 315, or if a valid extension was not entered at Block 320, then conventional speed dialing operations may be performed at Block 330 to determine whether the entered digits qualify as a valid speed dial number. If the mobile radiotelephone also includes automatic area code systems and methods, they are performed at Block 230. Finally, a radiotelephone communication to a destination telephone is initiated at Block 210 using the identified prefix followed by the user-entered extension.

Figure 4:
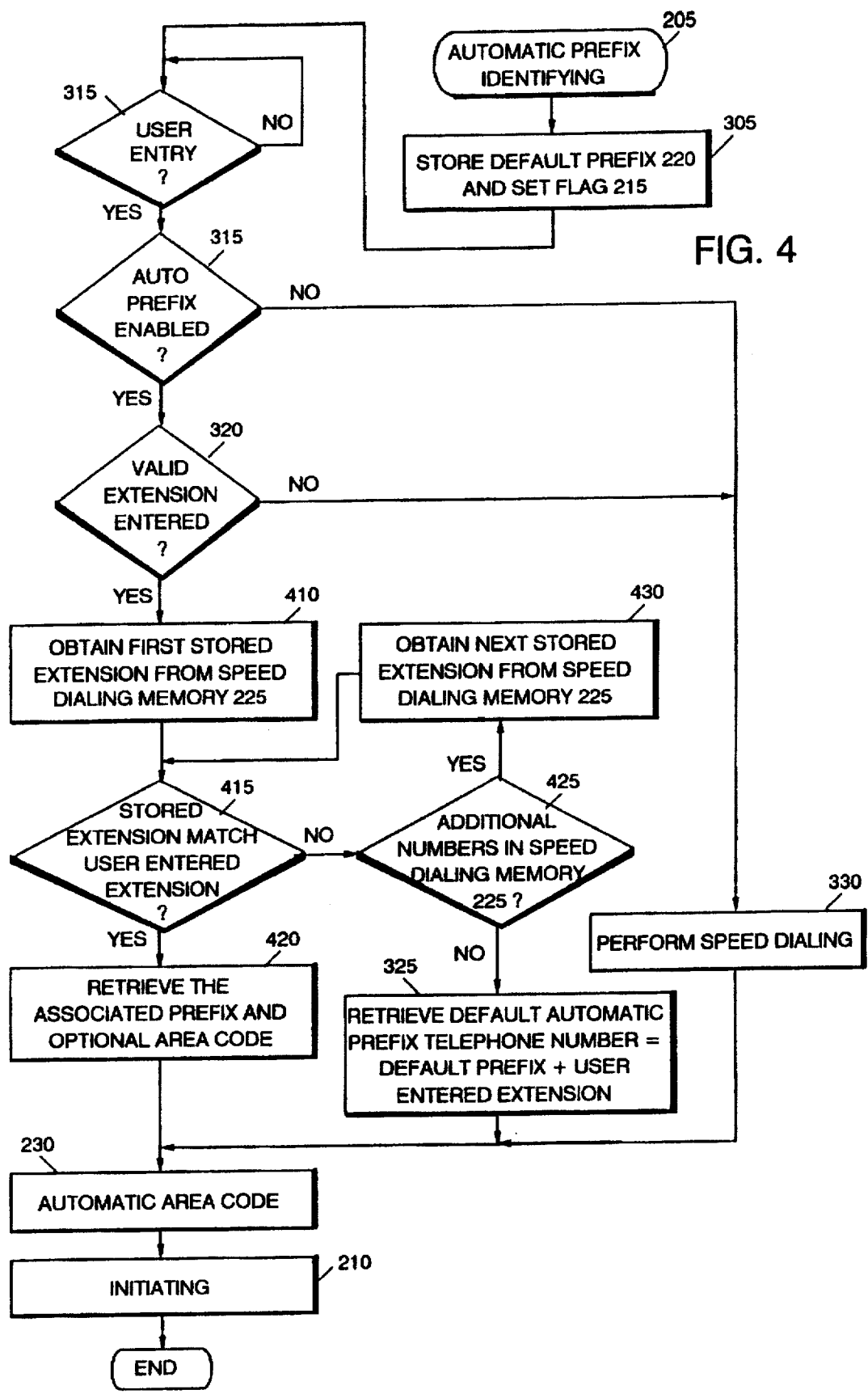
FIG. 4, is a flowchart illustrating detailed operations for second and third embodiments of automatic prefix identifying according to the present invention.

Referring now to FIG. 4, detailed operations for the second and third embodiments of automatic prefix identifying (Block 205 of FIG. 2) will now be described. Operations at Blocks 305, 310, 315 and 320 are performed as already described in connection with FIG. 3. It will be understood that if flag 215 has already been set, the operations of Block 305 need not be performed. Moreover, since the second embodiment does not use the default prefix, it need not be stored at Block 305. At Block 410, a first stored extension is obtained from speed dialing memory 225. At Block 415, a test is made as to whether the stored extension matches the user-entered extension. If "yes", then at Block 420 the associated prefix and optionally the area code is retrieved from the speed dialing memory 225. The user-entered extension may also be retrieved from the speed dialing memory 225. Alternatively, the prefix, optional area code and optional extension can be retrieved during the operation of Block 410 and a separate operation in Block 420 need not be performed if a match is present.

If a match does not occur at Block 415, a test is made at Block 425 as to whether additional numbers are present in speed dialing memory 225. If there are additional numbers present, then at Block 430 the next stored extension is obtained from speed dialing memory 425 and a check is again made as to whether a match is present. The operations of Blocks 330, 230 and 210 are then performed as already described in connection with FIG. 3.

The third embodiment of the present invention automatically identifies a prefix using both the speed dialing memory and the stored default prefix. Accordingly, in FIG. 4 at Block 305, the default prefix 220 is stored if it has not already been stored. After the operations of Block 425, the operations of Block 325 are performed. Thus, if a match is not found in the speed dialing memory 225, then the default automatic prefix is used.

In all embodiments, automatic prefix systems and methods for mobile radiotelephones may reduce or simplify the number of keystrokes or other user inputs for dialing a telephone number. Simplified operation and enhanced safety for mobile radiotelephone users are thereby provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A mobile radiotelephone which communicates with destination telephones having local telephone numbers including a required multiple digit prefix followed by a required multiple digit extension, said mobile radiotelephone comprising:

automatic prefix identifying means, responsive to user entry of an extension, for identifying a prefix for the user-entered extension so as to generate a complete local telephone number including the identified prefix followed by the user-entered extension; and means, responsive to said automatic prefix identifying means, for initiating a radiotelephone communication to a destination telephone using the complete local telephone number including the identified prefix followed by the user-entered extension;

wherein said automatic prefix identifying means comprises:

means for storing a default automatic prefix which generates a complete local telephone number in combination with a multiple digit extension; and means, responsive to said user entry of an extension, for retrieving said stored default automatic prefix so as to generate a complete local telephone number.

2. A mobile radiotelephone according to claim 1 wherein said automatic prefix identifying means further comprises automatic prefix enabling means, for indicating that said automatic prefix identifying means is enabled; and wherein said retrieving means comprises means, responsive to said user entry of an extension and to said automatic prefix enabling means, for retrieving said stored automatic prefix so as to generate a complete local telephone number if said automatic prefix identifying means is enabled.

3. A mobile radiotelephone according to claim 1 wherein said automatic prefix identifying means further comprises:

a memory, for storing therein a plurality of telephone numbers, each including an extension and an associated prefix; and means, responsive to said user entry of an extension, for searching the stored extensions in said memory to identify a match to the user-entered extension, and for retrieving the associated prefix for the matched extension so as to generate a complete local telephone number.

4. A mobile radiotelephone according to claim 3 wherein said retrieving means is responsive to said searching means, for retrieving the stored default automatic prefix in response to said searching means failing to identify a match to the user-entered extension so as to generate a complete local telephone number using the stored default automatic prefix followed by the user-entered extension.

5. A mobile radiotelephone according to claim 4 wherein said memory further stores therein an area code for at least some of the plurality of telephone numbers, and wherein said searching means comprises:

means, responsive to said user entry of an extension, for searching the stored extensions in said memory to identify a match to the user-entered extension, and for retrieving the associated prefix and area code for the matched extension so as to generate a complete local telephone number and an area code.

6. A mobile radiotelephone according to claim 1 further comprising:

automatic area code identifying means, responsive to said mobile radiotelephone being located outside a home region, for identifying an area code corresponding to the home region;

said initiating means comprising means, responsive to said automatic area code identifying means and to said automatic prefix identifying means, for initiating a radiotelephone communication to a destination telephone using the identified area code followed by the identified prefix followed by the user-entered extension.

7. A mobile radiotelephone according to claim 1 wherein said automatic prefix identifying means operates independent of location of said mobile radiotelephone within or outside a home region.

8. A mobile radiotelephone according to claim 1 wherein said storing means is responsive to user entry of a default automatic prefix for storing the user-entered default automatic prefix.

9. A mobile radiotelephone communications method for communicating with destination telephones having local telephone numbers including a required multiple digit prefix followed by a multiple digit extension, said mobile radiotelephone communicating method comprising the steps of:

automatically identifying a prefix in response to user entry of an extension so as to generate a complete local telephone number including the identified prefix followed by the user-entered extension; and initiating a radiotelephone communication to a destination telephone using the complete local telephone number including the identified prefix followed by the user-entered extension;

wherein said automatically identifying step comprises the steps of:

storing a default automatic prefix which generates a complete local telephone number in combination with a multiple digit extension; and retrieving said stored default automatic prefix in response to user entry of an extension so as to generate a complete local telephone number.

10. A method according to claim 9 wherein said automatically identifying step further comprises the step of indicating that automatic prefix identifying is enabled; and wherein said retrieving step comprises the step of retrieving said stored automatic prefix so as to generate a complete local telephone number if automatic prefix identifying is enabled.

11. A method according to claim 9 wherein said automatically identifying step further comprises the steps of:

storing in a memory a plurality of telephone numbers, each including an extension and an associated prefix;

searching the stored extensions in the memory to identify a match to the user-entered extension; and retrieving the associated prefix for the matched extension so as to generate a complete local telephone number.

12. A method according to claim 11 wherein said retrieving step further comprises the step of:

retrieving the stored default automatic prefix in response to said searching step failing to identify a match to the user-entered extension so as to generate a complete local telephone number using the stored default automatic prefix followed by the user-entered extension.

13. A method according to claim 11 wherein said memory further stores therein an area code for at least some of the plurality of telephone numbers, and wherein said retrieving step comprises the step of:

retrieving the associated prefix and area code for the matched extension so as to generate a complete local telephone number and an area code.

14. A method according to claim 9 further comprising the step of:

automatically identifying an area code corresponding to a home region, in response to the mobile radiotelephone being located outside the home region;

said initiating step comprising the step of initiating a radiotelephone communication to a destination telephone using the identified area code followed by the identified prefix followed by the user-entered extension.

15. A method according to claim 1 wherein said automatically identifying step is performed independent of location of said mobile radiotelephone within or outside a home region.

16. A method according to claim 9 wherein said automatically identifying step is preceded by the step of storing a user-entered default automatic prefix.

* * * * *